United States Patent [19]

Wright

[11] Patent Number: 4,738,332

[45] Date of Patent: Apr. 19, 1988

[54] TORQUE SPLITTING SYSTEM FOR VEHICLES

[75] Inventor: Peter G. Wright, Norwich, England

[73] Assignee: Group Lotus PLC, Norfolk, England

[21] Appl. No.: 926,315

[22] Filed: Oct. 31, 1986

[30] Foreign Application Priority Data

Nov. 1, 1985 [GB] United Kingdom ............... 8526970

[51] Int. Cl.$^4$ ............................................. B60K 17/348
[52] U.S. Cl. .................... 180/197; 74/665 G; 74/674; 74/682; 180/242; 180/248; 180/142
[58] Field of Search ............. 180/197, 223, 242, 248, 180/6.44, 142; 280/707; 74/665 F, 665 G, 665, 674, 682

[56] References Cited

U.S. PATENT DOCUMENTS

| | | | |
|---|---|---|---|
| 3,371,734 | 3/1968 | Zaunberger et al. | 180/6.44 |
| 3,455,407 | 7/1969 | Phillips | 180/248 |
| 3,897,846 | 8/1975 | Inoue | 180/142 |
| 3,963,085 | 6/1976 | Vinton | 180/44 R |
| 4,344,335 | 8/1982 | Kawai | 74/674 |
| 4,367,661 | 1/1983 | Moroto et al. | 74/665 GE |
| 4,511,014 | 4/1985 | Makita | 180/233 |
| 4,657,280 | 4/1987 | Ohmori | 280/707 |

FOREIGN PATENT DOCUMENTS 2132146A 7/1984 United Kingdom .

Primary Examiner—John J. Love
Assistant Examiner—Donn McGiehan
Attorney, Agent, or Firm—Seidel, Gonda, Goldhammer & Abbott

[57] ABSTRACT

A torque splitting device (12) capable of use in a four wheel drive road vehicle has two coupled epicyclic differential devices providing the two outputs and connected respectively with a torque input shaft (30), which may be driven by a vehicle gearbox and a control shaft (35). The control shaft is driven from the input shaft (35) by way of an infinitely variable ratio drive means comprising a fixed displacement hydrostatic motor (51) coupled with a variable displacement hydrostatic pump (50) which is controlled by signals from a control unit (60). The unit (60) may be responsive to signals representing vehicle control and/or experience.

19 Claims, 2 Drawing Sheets

TORQUE SPLITTING SYSTEM FOR VEHICLES

FIELD OF THE INVENTION

The invention relates to vehicles in which a propulsive drive from the vehicle engine is applied to both a forward and a rear axle, and to a torque splitting or division system capable of use in such vehicles.

BACKGROUND OF THE INVENTION

In vehicles of this kind, which are known in the case for example of otherwise conventional passenger road vehicles as "four-wheel drive" vehicles, the torque from the vehicle engine is split into two for application to the front and rear axles, either equally or in some other predetermined way. Adjustment of the ratio of torque division is however desirable in some circumstances.

It is accordingly an object of the invention to provide a simple and efficient torque splitting system for achieving this.

SUMMARY OF THE INVENTION

The invention accordingly provides a differential speed control system for use in a vehicle in which engine generated propulsive torque is applied to both front and rear axles, the system comprising torque splitting means for dividing the propulsive torque between the front and rear axles in a predetermined ratio, and control means responsive to vehicle control and/or experience to effect adjustment of the division ratio.

The control means of the system of the invention can thus comprise a computer receiving response feedback signals dependent on vehicle control, for example, steering angle, and from speed and inertial reference sensors. The system can be associated with an active suspension system where such a system is incorporated in the vehicle, the control means operating for example to control lateral load transfer distribution in a way similar to the way in which such load distribution is controlled by the suspension system.

The system can also include control elements by which it can be associated with anti-lock and/or anti-wheelspin control arrangements. The system may be responsive to various inputs, derived for example from one or more of such factors as tyre or road conditions, loading, power, slip angle and vehicle dynamic state.

The system can moreover provide for the control of overall slip ratios, in both traction and braking, so that peak values are not exceeded.

The invention also provides a torque splitting system comprising first and second epicyclic differential devices having respective inputs coupled together to provide the system outputs, the system input being applied to the first device and a control input to the second device. The control input which may be derived from the system input after modification by adjustment means determines the torque division between the system outputs.

Preferably the two epicyclic differential devices have sun gears connected together by being mounted on a common shaft which provides one of the system outputs. The annuli of the two devices are coupled together by gear means to rotate in opposed directions and provide the second system output. The system and control inputs are applied to the planetary gears that is, to the spiders mounting the planetary gears of the first and second devices respectively. A shaft of the gear means connecting together the two annuli can provide the second output which can instead be taken from the annulus of the second device.

When incorporated in a vehicle differential speed control system as above described, the torque splitting system of the invention receives its input from the vehicle engine, normally through a speed-selection gearbox, and supplies its outputs to the front and rear axles. The control input can be derived from the input through any suitable infinitely variable ratio drive device controlled in accordance with an output signal from the system control means.

It will be understood that the system of the invention controls the speed or R.P.M. (revolutions per minute) of the output shafts so that the input torque is split in some ratio dependent on a vehicle condition.

BRIEF DESCRIPTION OF THE DRAWINGS

The invention is further described below by way of illustration with reference to the accompanying drawings, in which.

DESCRIPTION OF THE PREFERRED EMBODIMENT

Figure 1:
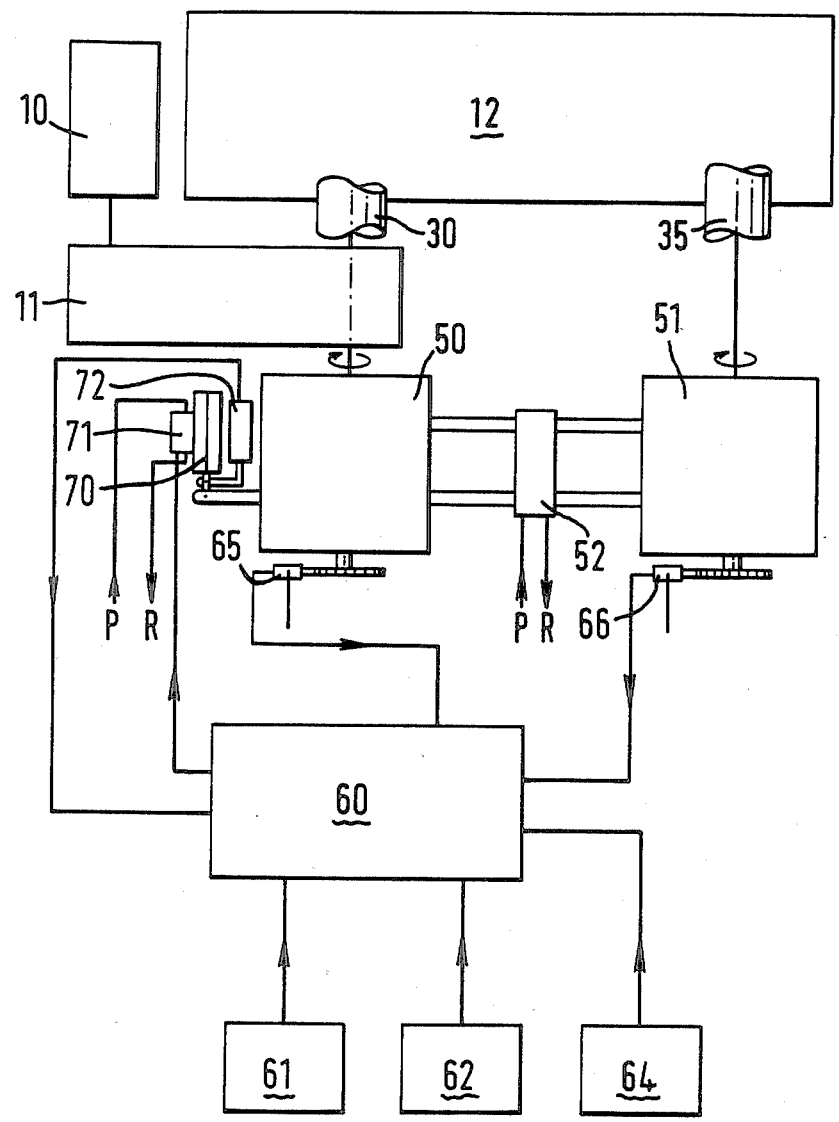
FIG. 1 schematically shows a differential speed control system embodying the invention.
Figure 2:
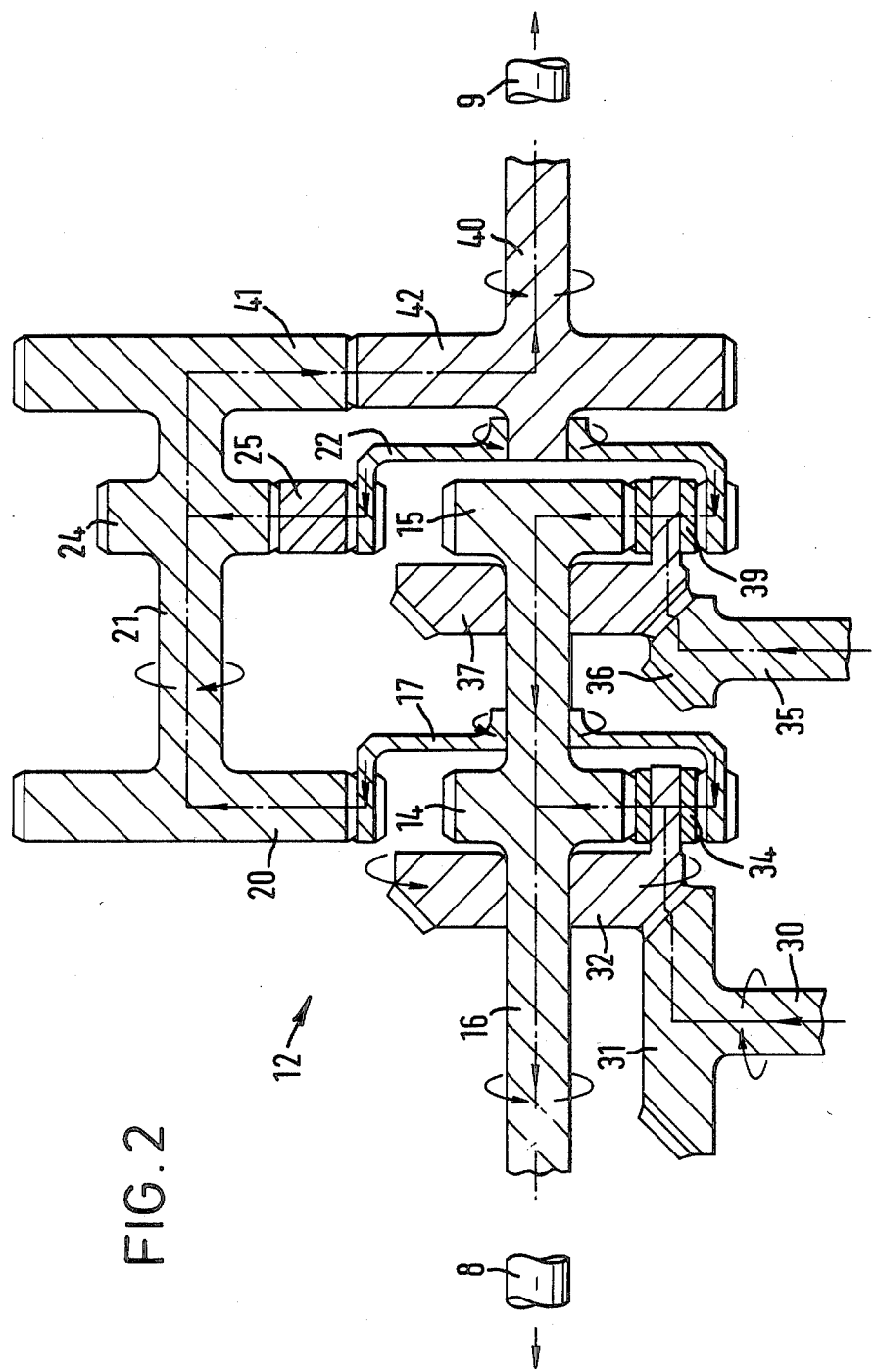
FIG. 2 schematically shows a differential speed control gear box included in the system of FIG. 1.

The differential speed control system illustrated is for use in a road vehicle, for example a passenger car, having front and rear road wheels driven respectively by way of front and rear axles 8 and 9 by an engine 10, through a gear box 11 operated by the driver. The gear box 11 may be conventional, in providing a reverse and three or four forward speeds. The system also comprises a differential speed control gear box 12 by which the torque generated by the engine 10 is divided between the front and rear axles 8 and 9.

The gearbox 12 comprises first and second epicyclic differential gear devices, of which the respective sun gears 14,15 are secured to a common shaft 16 which carries torque to the front axle 8. The annulus 17 of the first device is coupled by its external gear teeth to a gear wheel 20 secured to a layshaft 21, and the annulus 22 of the second device is geared to another gear wheel 24 on the layshaft, by way of an intermediate gear 25, so that the annuli rotate in opposite directions.

The output shaft 30 of the gear box 11 carries a first bevel gear 31 meshing with a second bevel gear 32 which is journalled on the shaft 16 and connected to the spider (not shown) carrying the planetary gears 34 of the first epicyclic differential device. A control input shaft 35 is similarly coupled, through meshing bevel gears 36,37 to the spider carrying the planetary gears 39 of the second differential device.

A drive is supplied to the rear axle 9 of the vehicle through a shaft 40 which is coaxial with the shaft 16 and on which is journalled the annulus 22 of the second device. The shaft 40 is driven from the layshaft 21 by meshing gears 41,42. The drive to the rear axle 9 could instead be taken directly from the annulus 22.

The torque applied to the first differential device from the vehicle gear box 11 is split by the first device between the sun gear 14 and the annulus 17 in a ratio, not necessarily 1:1, determined by the gearing of the device and if the spider mounting the planetary gears 39 for the second device is held stationary by the shaft 35, the two output shafts 16 and 40 will rotate at the same speed, with the planetary gears 39 of the second device spinning freely. However, if the spider of the first device is held stationary and that of the second is rotated the two output shafts 16 and 40 will rotate at the same speed but in opposite directions, and if the direction of rotation of the second spider is reversed, the rotational directions of the two output shafts will also reverse.

In operation of a vehicle incorporating the system illustrated, the second spider can be rotated by the control input shaft 35 at a rather different speed from that at which the gear box output shaft 30 rotates the first spider, with the result that the output shaft speeds differ. The speed of one output shaft is the sum of the two input speeds and that of the other will be the difference, so with a speed change at shaft 35, one output shaft increases in speed and the other slows down by an equal amount. Thus:

$$S_{OF} = S_{I1} + S_{I2}$$

$$S_{OR} = S_{I1} - S_{I2}$$

where $S_{OF}$ is the rotational speed of the output shaft 16, $S_{OR}$ is that of the output shaft 40 driving the rear axle, $S_{I1}$ is the input speed to the first epicyclic differential device and $S_{I2}$ that to the second device. The input and output torques follow a similar relationship, so that the relative rotational speeds of the two output shafts 16 and 40 can be precisely adjusted by driving the first and second planetary spiders at a variable and reversible speed ratio. Thus, the relative slip ratios at the front and rear wheels of the vehicle also are precisely controlled.

The control input shaft 35 is preferably driven from the gear box output shaft 30 and the two shafts can be connected for the purpose by any suitable infinitely variable ratio drive means. It can be shown that the drive to the control input shaft must be capable in practice of transmitting some 10% of the maximum power of the vehicle engine 100, so because of this and because power will not be transmitted during normal driving conditions, a low efficiency drive means can be tolerated. It is preferred as shown in FIG. 1 to provide a hydrostatic device in the form of a variable displacement hydrostatic pump 50 driven by the gear box output shaft 30 and coupled to a fixed displacement hydrostatic motor 51 driving the control input shaft 35. A relief and replenishing network 52 is incorporated in the hydraulic system between the pump 50 and the motor 51.

The displacement of the pump 50 is varied by adjustment of its variable angle swashplate actuator. This adjustment can be effected electro-hydraulically, as by an hydraulic actuator 70 controlled by a servovalve 71 receiving control signals from a computerised control unit 60. A position sensor in the form of a linear variable displacement transformer 72 senses the swash plate angle and provides a feedback signal to the unit 60.

The control unit 60 is responsive to outputs derived from vehicle control and condition sensors, comprising as shown inputs from a steering angle sensor 61, a vehicle speed sensor 62 and inertial reference sensor means 64. Speed or R.P.M. sensors 65 and 66, driven respectively by the gear box output shaft 30 and the control input shaft 35, also supply inputs to the unit 60.

The vehicle incorporates an active suspension system which can advantageously be in accordance with the disclosure of EP No. 0 114 757 (GL 1) and EP No. 0 142 947 (GL 2), and the same hydraulic supply can be used for this and for the speed control system. The active suspension system can thus include a hydro-pneumatic suspension device for each road wheel, controlled by a servo-valve, and of which the length or piston position is measured by a linear variable displacement transformer. The loads on the suspension devices can also be measured by suitable transducers, and the outputs obtained supplied to the control unit 60 together with other inputs required by the unit to exercise its desired control function on the pump 50 and on the suspension device servo-valves. The control lever by which the pump 50 is arranged to operate can accommodate variations in rolling radius front to rear or such accommodation can be provided by leakage in the hydrostatic motor 51.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A torque splitting system for a vehicle having front and rear axles drivable by an engine, said system comprising:

torque division means for dividing said received engine torque into front axle and rear axle torques in an adjustable ratio, said torque division means comprising first and second epicyclic differential devices and means coupling said first and second devices together, each of said first and second devices providing a respective one of said axle torques, means for receiving torque from said vehicle engine and providing an input to said first device, a source of signals dependent on at least one vehicle condition, and control means providing an input to said second device for selectively adjusting the ratio of said front axle torque to said rear axle torque in response to said vehicle condition dependent signal.

2. The system of claim 1 further comprising and active suspension system and wherein said control means is responsive to said active suspension system.

3. The system of claim 1 wherein said at least one vehicle condition is selected from the group comprising a vehicle control and a vehicle experience condition.

4. The system of claim 1 wherein said at least one vehicle condition is selected from the group comprising vehicle steering angle, vehicle speed and vehicle attitude.

5. The system of claim 1 further comprising signal generating means for generating signals dependent on said inputs to said first and second devices and wherein said control means is responsive to said signals.

6. The system of claim 1 further comprising means deriving said input to said second device from said vehicle engine torque.

7. A torque division system comprising:

a first differential device having an input for receiving an input torque to be divided, and an output constituting a first system output, a second differential device having an input for receiving a variable control input and an output constituting a second system output, and means coupling together said first and second differential devices, whereby variation of said control input alters the ratio in which the input torque is divided between the first and second system outputs.

8. The system of claim 7 wherein each of said first and second differential devices comprises a sun gear, a set of planetary gears, and an annulus, and wherein said coupling means comprise a shaft to which both of said sun gears are secured and gearing coupling together said annuli so as to rotate in opposite directions.

9. The system of claim 8 wherein said shaft provides one of said system outputs, and one of said annuli provides the other of said system outputs.

10. The system of claim 9 further comprising an output shaft driven by said gearing and wherein said output shaft provides said other of said system outputs.

11. The system of claim 10 wherein said output shaft is in alignment with said shaft providing said one of said system outputs.

12. The system of claim 7 further comprising an adjustable drive means connecting said input torque to said control input.

13. The system of claim 12 wherein said adjustable drive means comprises connected hydrostatic pump and motor means.

14. A vehicle comprising:
a torque division system as claimed in claim 7,
an engine providing a drive torque,
means coupling said engine drive torque to said first differential device input,
front and rear road wheel axles,
means coupling said first system output to said front axle,
means coupling said second system output to said rear axle,
sensing means sensing at least one vehicle condition and providing an output dependent thereon,
means altering said variable control input in response to changes in said sensing means output.

15. A road vehicle comprising;
an engine providing propulsion torque,
a gear box receiving said engine propulsion torque and providing an output torque,
a first differential device receiving said gear box output torque,
a first road wheel axle driven by said first differential device,
a variable ratio drive device receiving said gear box output torque and providing a control torque,
a second differential device receiving said control torque,
a second road wheel axle driven by said second differential device,
coupling means coupling together said first and said second differential devices,
sensor means responsive to at least one vehicle condition to provide a sensor output signal, and a control device responsive to said sensor output signal to provide a control output signal, said variable drive device being responsive to control output signal to alter said control torque to thereby adjust the ratio in which output torque is divided between said first and second road wheel axles.

16. The road vehicle of claim 15 wherein said variable ratio drive device is an infinitely variable ratio drive device.

17. The road vehicle of claim 16 wherein said infinitely variable ratio drive device comprises a variable displacement hydrostatic pump driven by said gear box output torque and a fixed displacement hydrostatic motor coupled to said hydrostatic pump and providing said control torque.

18. The road vehicle of claim 15 wherein said sensing means is responsive to at least one of vehicle steering angle, vehicle speed, vehicle attitude and said output and control torques.

19. The road vehicle of claim 15 further comprising an active suspension system and wherein said control device is responsive to said active suspension system.

* * * * *